United States Patent
Xi

(10) Patent No.: US 10,175,569 B1
(45) Date of Patent: Jan. 8, 2019

(54) DYNAMIC PROJECTION LIGHT WITH POSTS FIXED STRUCTURE

(71) Applicant: Guangdong YUHAO Electronics Co., Ltd., Dongguan (CN)

(72) Inventor: Jun Xi, Dongguan (CN)

(73) Assignee: GUANGDONG YUHAO ELECTRONICS CO., LTD., Dongguan (CN)

( * ) Notice: Subject to any disclaimer, the term of this patent is extended or adjusted under 35 U.S.C. 154(b) by 0 days.

(21) Appl. No.: 15/801,481

(22) Filed: Nov. 2, 2017

(30) Foreign Application Priority Data

Jul. 6, 2017 (CN) .................... 2017 2 0809935 U

(51) Int. Cl.
| | | |
|---|---|---|
| G03B 21/16 | (2006.01) |
| G03B 21/52 | (2006.01) |
| G03B 35/20 | (2006.01) |
| G03B 21/20 | (2006.01) |
| G03B 21/14 | (2006.01) |

(52) U.S. Cl.
CPC .......... *G03B 21/52* (2013.01); *G03B 21/145* (2013.01); *G03B 21/16* (2013.01); *G03B 21/2033* (2013.01); *G03B 35/20* (2013.01)

(58) Field of Classification Search
CPC ...... G03B 21/52; G03B 21/145; G03B 21/16; G03B 21/2033; G03B 35/20
See application file for complete search history.

(56) References Cited

U.S. PATENT DOCUMENTS

| | | | |
|---|---|---|---|
| 8,721,160 B2* | 5/2014 | Chien ................ | F21S 9/02 362/641 |
| 2007/0183152 A1* | 8/2007 | Hauck ............... | B60Q 1/2607 362/249.07 |
| 2009/0003009 A1* | 1/2009 | Tessnow ............ | F21V 29/74 362/487 |
| 2009/0175033 A1* | 7/2009 | Chien ................ | H04N 5/2354 362/183 |
| 2012/0092623 A1* | 4/2012 | Huebner ........... | G03B 21/001 352/81 |
| 2015/0219903 A1* | 8/2015 | Chien ................ | G02B 27/08 353/1 |
| 2016/0215962 A1* | 7/2016 | Chien ................ | F21V 14/08 |

* cited by examiner

*Primary Examiner* — Cara E Rakowski
*Assistant Examiner* — Magda Cruz
(74) *Attorney, Agent, or Firm* — Hemisphere Law, PLLC; Zhigang Ma

(57) ABSTRACT

A dynamic projection light includes several projection units fixed in a housing and a controller used for sequentially turning on and turning off at least a part of the several projection units to produce at least one moving image. Each projection unit is used for projecting a preset image and includes an LED head, a magnifying lens configured in front of the LED head and configured for diffusing light from the LED head, an optical sheet configured in front of the magnifying lens and having a preset pattern, and a condenser lens configured in front of the optical sheet. By arranging different preset patterns of the optical sheets, utilizing the human visual persistence phenomenon, projected animation images of human or animal walking or running or jumping or swinging, or leaves or petals or snowflakes falling, or objects rolling et al. may be realized, having a strong appreciation.

8 Claims, 3 Drawing Sheets

DYNAMIC PROJECTION LIGHT WITH POSTS FIXED STRUCTURE

BACKGROUND OF THE INVENTION

1. Field of the Invention

The present invention relates to projection lights, and more particularly to a dynamic projection light which can project animated images.

2. Description of Related Art

Traditional dynamic projection light typically includes an LED light, a film with images printed thereon, a magnifying lens for diffusing light positioned between the LED light and the film, and a condenser lens positioned in front of the film. A motor and a gear set are utilized to rotate the film. In operation, lights from the LED light are diffused and softed by the magnifying lens, and then change their colors and brightness after passing through the film, and finally passing through the condenser lens and are projected to a plane to show animated images which rotate along an elliptical trace. The traditional dynamic projection light need the motor and the gear set to rotate the film, therefore the structure is complicated and the interior space is large.

Therefore, there is a need for an improved dynamic projection light.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawing, in which.

DETAILED DESCRIPTION OF THE INVENTION

The invention will now be described in detail through several embodiments with reference to the accompanying drawing.

Figure 1:
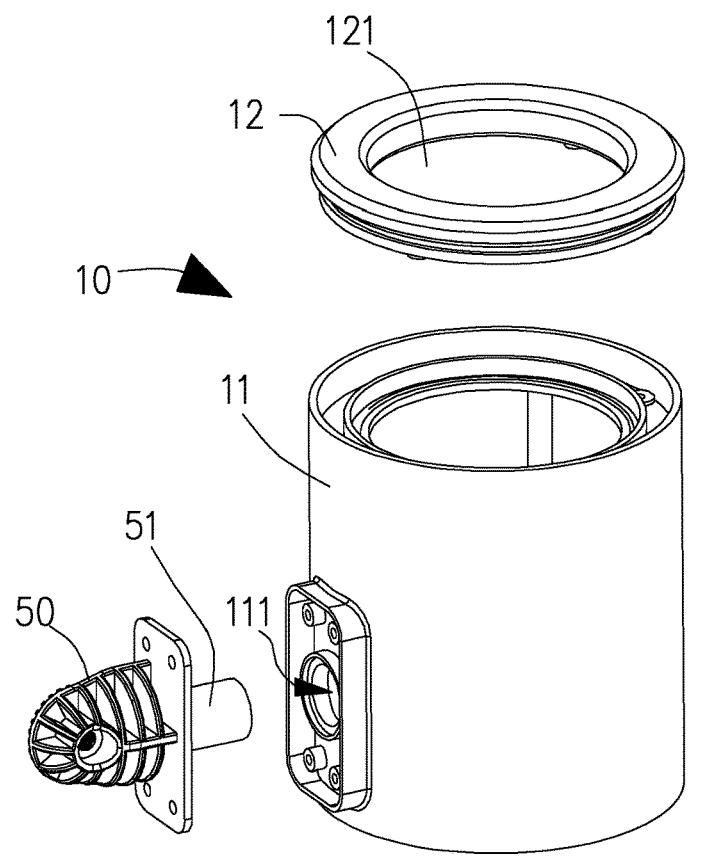
FIG. 1 is an exploded view of a dynamic projection light in accordance with a first embodiment of the present invention.
Figure 1:
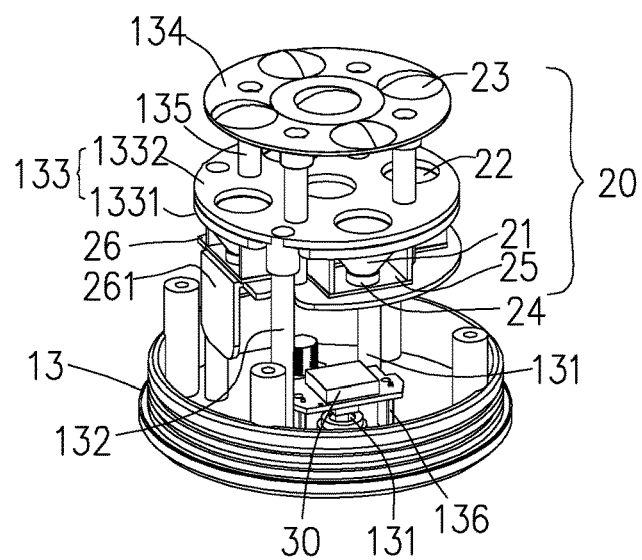
Figure 2:
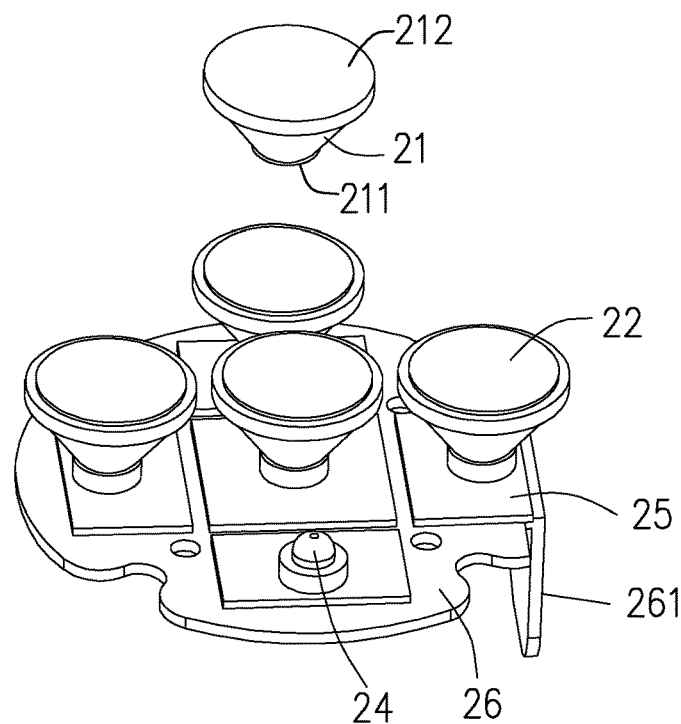
FIG. 2 is a perspective view of a part of a light module of the dynamic projection light of FIG. 1.
Figure 3:
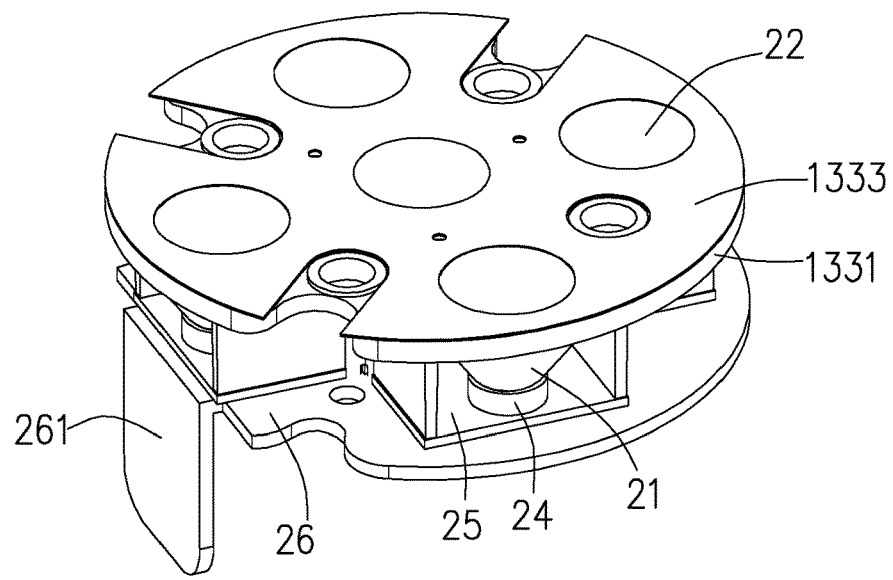
FIG. 3 is a perspective view of the other part of the light module of the dynamic projection light of FIG. 1.

Please refer to the FIG. 1 to FIG. 3, a dynamic projection light in accordance with a first embodiment of the present invention includes a housing 10 housing five projection units 20, a controller 30 used for controlling the five projection units 20, and fixation assemblies used for fixing the several projection units 20 and the controller 30.

The housing 10 includes a tubular shell 11 defining a front opening and a back opening in its two ends, a front cover 12 used for covering the front opening and a back cover 13 used for covering the back opening of the tubular shell 11. The front opening sealed by the front cover 12 acts as a light outlet of the dynamic projection light, therefore the front cover 12 defines a transparent window allowing light pass through. The back cover 13 defines a hole permitting one or more electric wires used for supply electric power to the controller 30 to pass through. The front cover 12 and the back cover 13 are waterproof. Waterproof silicone rings or sealant may be used between the front cover 12 and the tubular shell 11, and between the back cover 13 and the tubular shell 11, and between the electric wires and the hole in the back cover 13. The housing 10 further defines a middle opening 13 in its side wall close to the rear opening in the embodiment.

For the convenience of the description, a side/surface/direction towards the front opening is defined a front side/surface/direction, and a side/surface/direction towards the rear opening is defined the rear side/surface/direction.

The five projection units 20 are capable of independently projecting images to a preset plane at the same position (point) or different positions (points). The images the five projection units 20 projected may be the same or different. By controlling the controller 30, at least a part of the five projection units 20 may be sequentially lit (turned on, lighted up) and extinguished (turned off) to produce at least one moving image. Preferably, when one of the at least a part of the five projection units 20 is turned on, the others of the at least a part of the five projection units 20 is turned off. In other embodiment, an overlap of a turned-on-time may be existed among adjacent projection units 20.

In the embodiment, each projection unit 20 includes a magnifying lens 21, an optical sheet 22, a condenser lens 23 and an LED head 24. The LED head 24, the magnifying lens 21 and the optical sheet 22 are fixed sequentially in a direction from the back cover 13 to the front cover 12. The LED head 24 is fixed to a circuit board 25 and is electrically connected to the controller 30. The magnifying lens 21 is used for diffusing light emitted from the LED head 24, and is solid and substantially truncated cone-shaped. One end surface 211 which is smaller than the other end surface 212 of the magnifying lens 21 defines an arc-shaped concave, covers the LED head 24 and locates in front of the LED head 24. The end surface 212 of the magnifying lens 21 faces the optical sheet 22.

The optical sheet 22 is circular and its diameter is slightly smaller than the diameter of the end surface 212 of the magnifying lens 21. In the embodiment, the optical sheet 22 includes a film base made from polyethylene terephthalate (PET), and several printing layers printed on a front surface of the film base in sequence. Each printing layer is formed by screen printing utilizing a color anti-uv (ultraviolet light) screening ink and all these layers form a preset pattern. Furthermore, a thickness of the film base is 0.8~1.5 mm, a total thickness of the several printing layers is 0.05~0.1 mm. Therefore, the optical sheet 22 can resist a temperature higher than 80 degrees Celsius without deformation and color fading.

In other embodiments, the optical sheet 22 may be an exposed film having the preset pattern, or a metal sheet with the preset pattern cut-out in the centre.

The condenser lens 23 is a convex lens with a diameter bigger than the end surface 212 of the magnifying lens 21. The condenser lens 23 is fixed in front of the optical sheet 22.

In the embodiment, one of the projection units 20 is located in a center of a circle formed by the other projection units 20. The preset patterns of the other projection units 20 which form the circle are rotational symmetry around the center. While the preset pattern of the projection unit 20 which is located in the center may be different from the preset patterns of the other projection units 20. As a result, the controller 30 may control the LED head in the center to light up always, and the other LED head located in the circle are controlled to clockwise or anticlockwise light up then be turned off sequentially to produce a moving image moving around a still image.

In other embodiment, the projection units 20 may be arranged to form other geometric figures, like an ellipse, and are sequentially lit and extinguished. By arranging different preset patterns of the optical sheets 22, using the human visual persistence phenomenon, projected animation images of human or animal walking or running or jumping or swinging, or leaves or petals or snowflakes falling, or objects rolling et al. may be realized, having a strong appreciation.

In this embodiment, the fixation assemblies used for fixing the projection units 20 includes several first posts 131 and several second posts 132 extending from the back cover 13 towards the front cover 12. The second posts 132 are arranged closer to periphery than the first posts 131. A height of the second posts 132 are higher than that of the first posts 131. The fixation assemblies also includes a first fixation assembly 133 for fixing the circuit board 25, a second fixation assembly 134 for fixing the condenser lenses 23, and several connection posts 135.

In order to better dissipate heat, the circuit board 25 is fixed on a cooling plate 26, and the cooling plate 26 is fixed at the end of the first posts 131. The end surfaces 211 of the magnifying lenses 21 cover the LED heads 24 on the the circuit board 26. The first fixation assembly 133 includes a first board 1331, a second board 1332 and a film fixation plate 1333 between the first board 1331 and the second plate 1332. The first board 1331 is fixed on the end of second posts 132, and defines a plurality of first holes each having a size matched with a size of a front end (end surface) 212 of the magnifying lenses 21 and a plurality of second holes for receiving the first posts 131. The end surfaces 211 cover the LED heads 24 respectively, and the end surfaces 212 insert in the first holes in the first board 1331, thus the magnifying lenses 21 are limited.

The film fixation plate 1333 is arranged between the first board 1331 and the second board 1332 and defines several holes for receiving the optical sheets 22. The optical sheets 22 are embedded in the holes in the film fixation plate 1333 and are located in front of the magnifying lenses 21. The second board 1332 is connected with the first board 1331 and defines several first holes with a smaller size when compared with the optical sheet 22 and several second holes for receiving the connecting posts 35. The optical sheets 22 are limited between the magnifying lenses 21 and the second board 1332.

The connection posts 135 are connected between the second board 1332 of the first fixation assembly 133 and the second fixation assembly 134, and used for supporting the second fixation assembly 134 in front of the first fixation assembly 133 at a preset distance. The second fixation assembly 134 defines holes used for holding the condenser lenses 23, and the condenser lenses 23 are fixed to the second fixation assembly 134.

A second plate 261 extends from an edge of the cooling plate 26 towards the back cover 13. A middle opening 111 is defined in the side wall of the tubular shell 11 at a position corresponding to the second plate 261. A heat transmission part 50 including a first end 51 inserting in the tubular shell 11 through the middle opening 111 and attached to the second plate 261, and a second end being out of the tubular shell 11. Heat generated by the LED heads 24 and the circuit board 25 is transmitted to the heat transmission part 50, therefor a temperature within the housing cannot be up to 80 degrees Celsius. Preferably, the temperature within the housing cannot be up to 50 degrees Celsius. Particularly, a layer of heat-conducting adhesive (not shown) is set between the cooling plate 26 and the heat transmission part 50.

Furthermore, two posts 136 acting as a fixture piece extends from the back cover 13 towards the front cover 12. The controller 30 is fixed to the ends of the posts 136 and does not attached the circuit board 25.

In other embodiments, each projection unit 20 may include two or more LED heads, such as three LED heads with different colors. The second fixation assembly 134 may directly fixed to the housing 10, but not via the connection posts 135.

Figure 4:
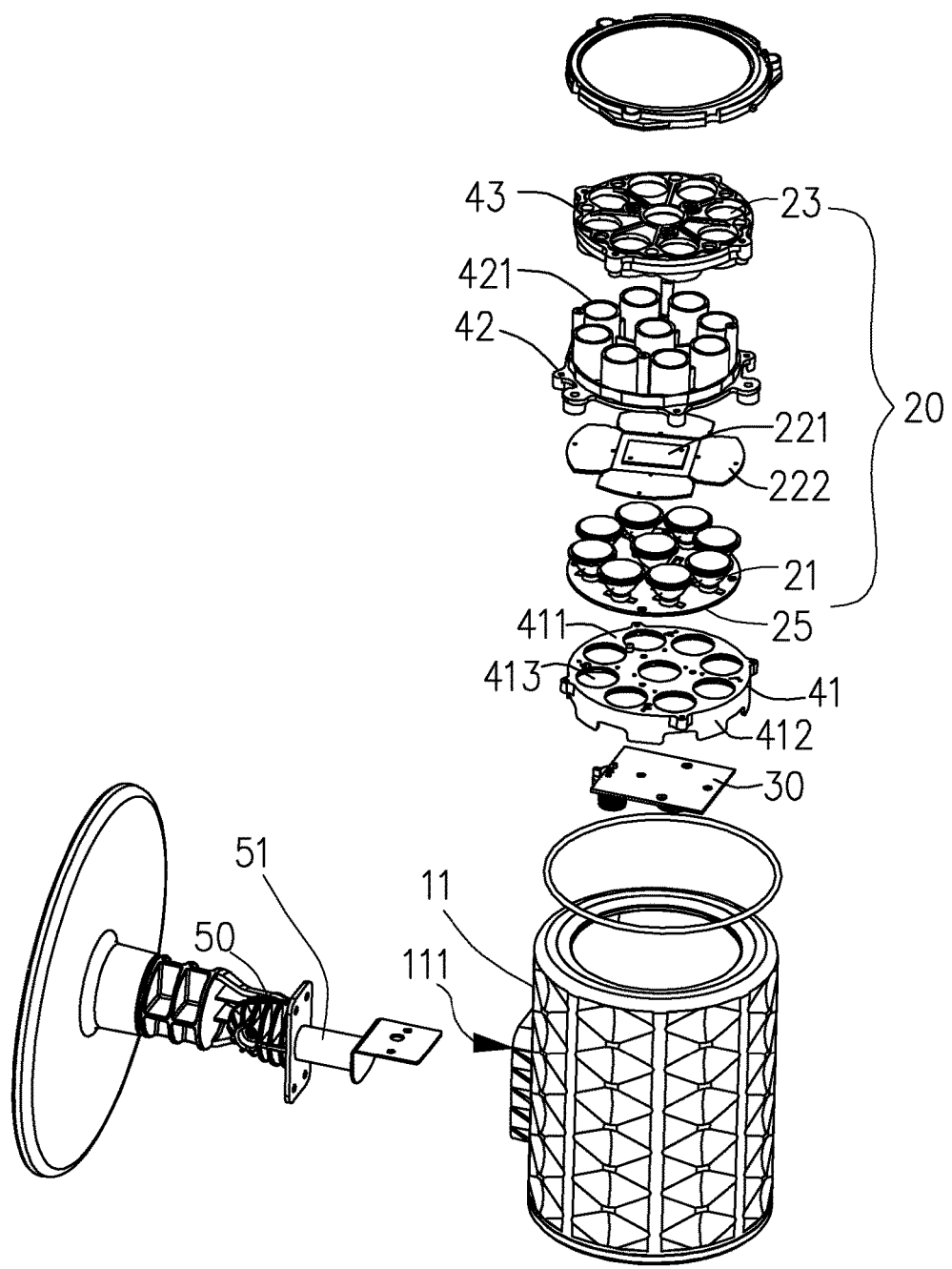
FIG. 4 is an exploded view of a dynamic projection light in accordance with a second embodiment of the present invention.

Please referring to FIG. 4, a dynamic projection light similar to the dynamic projection light in the first embodiment is shown in accordance to a second embodiment. The main differences between the dynamic projection lights in the first and second embodiments include the number of the projection units 20, the structure of the fixation assemblies used for fixing the projection units 20 and the controller 30 and the optical sheet.

In the second embodiment, there are nine projection units 20. One of the nine projection units 20 is arranged in a center, and the others are around the center.

In the first embodiment, each projection unit 20 includes one optical sheet 22. In the second embodiment, there are total five optical sheets 221, 222. The projection unit 20 in the center includes one optical sheet 221, and for the other projection units 20, every two projection units 20 share one optical sheet 222. Each optical sheet 222 has two preset patterns, therefore each projection unit 20 can independently project one image.

In the second embodiment, the controller 30 also connected to the back cover of the housing via posts or directly.

The fixation assemblies used for fixing the projection units 20 and the controller 30 includes an L-shaped metal sheet 52, a first support 41, a second support 42, and a third support 43. The L-shaped metal sheet 52 is connected to the end of the first end 51 of the heat transmission part 50. The circuit board 25 is attached to a top surface of the metal sheet 52.

The first support 41 includes a base plate 411 and a side wall 412 perpendicularly extends from the edge of the base plate 411. The base plate 411 defines nine holes 413. The first support 41 is connected to posts extending from the back cover (not shown in FIG. 2) or is connected to the side wall of the housing directly. The first support 41 is arranged in front of the magnifying lenses 21 and covers the magnifying lenses 21 and the LED heads below the magnifying lenses 21. The diameter of the holes 413 is smaller than the front end of the magnifying lens 21, therefore the magnifying lenses 21 are limited between the first support 41 and the circuit board 25 (or the LED heads).

The second support 42 is connected to the first support 41. The five optical sheets 221, 222 are clamped between the base plate 411 and the second support 42. Nine pipes or light guides 421 and several support posts 422 extend towards the third support 43 from the second support 42 having corresponding holes (not shown).

The third support 43 is connected to the ends of the support posts 422. The third support 43 includes at least two plates to clamp the condenser lenses 23. Understandably, there are nine holes permitting light to pass through.

In operation, light from each LED heads pass through a corresponding magnifying lens 21, a corresponding optical sheet (221 or 222), a corresponding pipe or light guide 421, and a corresponding condenser lens 23 in turn.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A dynamic projection light, comprising:
   a housing;
   a plurality of projection units configured in the housing and each configured for projecting a preset image; and
   a controller configured for sequentially turning on and turning off at least a part of the plurality of projection units to produce at least one moving image;
   wherein each projection unit comprises;
   an LED head electrically connected to the controller;
   a magnifying lens configured in front of the LED head and configured for diffusing light from the LED head;
   an optical sheet configured in front of the magnifying lens and having a preset pattern; and
   a condenser lens configured in front of the optical sheet;
   wherein the optical sheet is a film on which the preset pattern is printed, or an exposed film having the preset pattern, or a metal sheet with the preset pattern cut-out in the centre;
   wherein the housing defines a front opening and a back opening in its two ends and comprises a front cover covering the front opening and a back cover covering the back opening; the front cover defines a transparent window allowing light pass through, and the back cover defines a hole permitting one or more electric wires to pass through;
   wherein a plurality of first posts and second posts extend from the back cover towards the front cover, and a height of the second posts is higher than that of the first posts.

2. The dynamic projection light of claim 1, further comprising:
   a cooling plate fixed to ends of the first posts;
   one or more circuit boards with the LED heads of the plurality of projection units mounted thereon and attached to the cooling plate;
   a first fixation assembly fixed to ends of the second posts and defining holes at positions corresponds to the optical sheets, and
   a second fixation assembly fixed in front of the first fixation assembly at a preset distance;
   wherein the optical sheets are maintained in the holes of the first fixation assembly, the magnifying lenses are clamped between the LED heads and the first fixation assembly, and the condenser lenses are hold by the second fixation assembly.

3. The dynamic projection light of claim 2, further comprising a plurality of connection posts connected between the first fixation assembly and the second fixation assembly.

4. The dynamic projection light of claim 3, wherein the first fixation assembly comprises:
   a first board defining a plurality of first holes each having a size matched with a size of a front end of the magnifying lenses and a plurality of second holes for receiving the first posts;
   a second board connected with the first board and defining a plurality of first holes with a smaller size when compared with the optical sheet and a plurality of second holes for receiving the connection posts;
   a film fixation plate configured between the first board and the second board and defining a plurality of holes for receiving the optical sheets;
   wherein a size of the optical sheets is smaller than that of the front end of the magnifying lenses.

5. The dynamic projection light of claim 2, wherein a second plate extending from an edge of the cooling plate towards the back cover, a middle opening is defined in the side wall of the housing at a position corresponding to the second plate; and a heat transmission part comprises a first end inserting in the housing through the middle opening and attached to the second plate, and a second end being out of the housing.

6. The dynamic projection light of claim 2, wherein a fixture piece extends from the back cover towards the front cover, the controller is fixed to the fixture piece.

7. The dynamic projection light of claim 2, wherein one of the plurality of projection units is configured in a center point, and the other of the plurality of projection units are configured in a circle or an ellipse taking the center point as the center.

8. The dynamic projection light of claim 2, wherein the preset patterns of the optical sheets of the plurality of the projection units are different, or the preset patterns of the optical sheets of the plurality of the projection units are the same with each other but are configured rotationally symmetrical around the center point.

* * * * *